United States Patent
Wright

(10) Patent No.: US 7,553,035 B2
(45) Date of Patent: Jun. 30, 2009

(54) METHOD AND APPARATUS FOR CONSTRUCTING A PERFECT TROUGH PARABOLIC REFLECTOR

(76) Inventor: Greg J. Wright, 1319 Colony Ct., Flower Mound, TX (US) 75028

( * ) Notice: Subject to any disclaimer, the term of this patent is extended or adjusted under 35 U.S.C. 154(b) by 125 days.

(21) Appl. No.: 11/157,607

(22) Filed: Jun. 21, 2005

(65) Prior Publication Data

US 2005/0225885 A1 Oct. 13, 2005

Related U.S. Application Data

(63) Continuation-in-part of application No. 10/425,117, filed on Apr. 29, 2003, now abandoned.

(60) Provisional application No. 60/378,596, filed on May 7, 2002.

(51) Int. Cl.
*G02B 5/10* (2006.01)
*G02B 7/182* (2006.01)

(52) U.S. Cl. .................. 359/851; 359/853; 359/858; 359/859; 359/847

(58) Field of Classification Search ................ 359/850, 359/851, 853, 727, 730, 731, 847, 857, 858, 359/859; 126/684, 690, 694, 696
See application file for complete search history.

(56) References Cited

U.S. PATENT DOCUMENTS

| | | | | | |
|---|---|---|---|---|---|
| 2,664,026 | A | * | 12/1953 | Kavanagh | 359/731 |
| 2,916,966 | A | * | 12/1959 | Nomarski et al. | 359/731 |
| 3,966,308 | A | * | 6/1976 | Nilson | 359/845 |
| 4,087,682 | A | * | 5/1978 | Kolodziej | 362/297 |
| 4,092,979 | A | * | 6/1978 | Kotlarz | 126/628 |
| 4,135,493 | A | * | 1/1979 | Kennedy | 126/577 |
| 4,256,091 | A | * | 3/1981 | Pier St. | 126/694 |
| 4,268,332 | A | * | 5/1981 | Winders | 156/160 |
| 4,273,425 | A | * | 6/1981 | Canzek | 359/731 |
| 4,513,357 | A | * | 4/1985 | Nieda et al. | 362/544 |
| 4,835,380 | A | * | 5/1989 | Opheij et al. | 250/216 |
| 5,964,216 | A | * | 10/1999 | Hoffschmidt et al. | 126/696 |

FOREIGN PATENT DOCUMENTS

WO       WO 01/02780       *   1/2001

* cited by examiner

*Primary Examiner*—Ricky D Shafer
(74) *Attorney, Agent, or Firm*—Klemchuk Kubasta LLP; Keith E. Taber

(57) ABSTRACT

A coordinate system defines the length of the curve of a parabola used in constructing a parabolic trough reflector. The origin (0,0) of the coordinate system is at the bottom center of the coordinate system. The two upper points of the coordinate system define the width, height of the parabola. These points are defined as (X1,Y1)=(−width,height), and (X2,Y2)=(width,height). The equation defining the parabola is $f(x) = a \cdot x^2$, where $a = height/width^2$. The plot of this equation produces a parabola that fits into the coordinate system. Two small blocks are used as anchor points for the ends of the parabola. The length of the curve of the parabola is defined in the equation:

$$\text{length}(x) = a \cdot [x \cdot (x\sqrt{x^2+b^2}) + b^2 \cdot \ln(x+\sqrt{x^2+b^2})]$$

where $b = \frac{1}{2} \cdot a$.

An inexpensive trough reflector is constructed out of flexible material. It is used to build a much more complicated six reflector system to concentrate parallel radiation like sunlight much like a magnifying glass. This system also forms the basis for building a much more powerful telescope.

9 Claims, 10 Drawing Sheets

METHOD AND APPARATUS FOR CONSTRUCTING A PERFECT TROUGH PARABOLIC REFLECTOR

PRIORITY

Priority is based upon Provisional Application No. 60/378,596, filed May 7, 2002 and application Ser. No. 10/425,117. The present application is a continuation-in-part of application Ser. No. 10/425,117, filed Apr. 29, 2003 now abandoned.

FIELD OF THE INVENTION

The invention relates to parabolic reflectors and more particularly to a method and apparatus for constructing multiple parabolic reflectors from flexible material using a mathematically precise clamping system for various purposes.

BACKGROUND OF THE INVENTION

Parabolic reflectors can be constructed by shaping a flexible material to the parabolic shape. This is accomplished by bending the flexible material to form a parabola. In some instances, the parabola may be formed by molding the material to the parabolic shape and coating it with a suitable material.

In U.S. Pat. No. 4,115,177, a tool is provided for manufacturing parabolic solar reflectors. The tool employs an improved smooth convex parabolic surface terminating in edges remote from the parabolic vertex which are preferably placed under elastic tension tending to draw the edges toward each other. The improved convex surface is a film of plastic coated with chromium metal on its exterior surface. A multiple layered thermosetting plastic reflector support is molded onto the convex surface of the tool. The reflector support is removed from the tool and a layer of aluminum is vacuum deposited onto the interior concave parabolic reflector surface.

In U.S. Pat. No. 4,571,812, a solar concentrator of substantially parabolic shape is formed by preforming a sheet of highly reflective material into an arcuate section having opposed longitudinal edges and having a predetermined radius of curvature and applying a force to at least one of the opposed edges of the section to move the edges toward each other and into a predetermined substantially parabolic configuration and then supporting it.

A parabolic trough solar collector using reflective flexible materials is disclosed in U.S. Pat. No. 4,493,313. A parabolic cylinder mirror is formed by stretching a flexible reflecting material between two parabolic end formers. The formers are held in place by a spreader bar. The resulting mirror is made to track the sun, focusing the sun's rays on a receiver tube. The ends of the reflective material are attached by glue or other suitable means to attachment straps. The flexible mirror is then attached to the formers. The attachment straps are mounted in brackets and tensioned by tightening associated nuts on the ends of the attachment straps. This serves both to stretch the flexible material orthogonal to the receiver tube and to hold the flexible material on the formers. The flexible mirror is stretched in the direction of the receiver tube by adjusting tensioning nuts. If materials with matching coefficients of expansion for temperature and humidity have been chosen, for example, aluminum foil for the flexible mirror and aluminum for the spreader bar, the mirror will stay in adjustment through temperature and humidity excursions. With dissimilar materials, e.g., aluminized mylar or other polymeric material and steel, spacers can be replaced with springs to maintain proper adjustment. The spreader bar cross section is chosen to be in the optic shadow of the receiver tube when tracking and not to intercept rays of the sun that would otherwise reach the receiver tube. This invention can also be used to make non-parabolic mirrors for other apparatus and applications.

In U.S. Pat. No. 4,348,798, an extended width parabolic trough solar collector is supported from pylons. A collector is formed from a center module and two wing modules are joined together along abutting edges by connecting means. A stressed skin monocoque construction is used for each of the modules.

In U.S. Pat. No. 4,135,493, a parabolic trough solar energy collector including an elongated support with a plurality of ribs secured thereto and extending outwardly therefrom. One surface of said ribs is shaped to define a parabola and is adapted to receive and support a thin reflecting sheet which forms a parabolic trough reflecting surface. One or more of said collectors are adapted to be joined end to end and supported for joint rotation to track the sun. A common drive system rotates the reflectors to track the sun; the reflector concentrates and focuses the energy along a focal line. The fluid to be heated is presented along the focal line in a suitable pipe which extends therealong.

SUMMARY OF THE INVENTION

In the present invention, a coordinate system is defined such that the origin $(0,0)$ of the coordinate system is at the bottom center of the coordinate system as shown in FIG. 1. Two small rectangular anchor blocks, with predefined slots, at the two upper corners of the coordinate system define the width and height of the parabola. These points are defined as $(X1,Y1)=(-\text{width},\text{height})$, and $(X2,Y2)=(\text{width},\text{height})$. The equation defining the parabola is $f(x)=a \cdot x^2$, where $a=\text{height}/\text{width}^2$. The plot of this equation will produce a parabola that fits into the coordinate system, and touches the coordinate points $(0,0)$, $(X1,Y1)$ and $(X2,Y2)$. The two small blocks are used as anchor points for the ends of the parabola.

The basic method for building a single reflector utilizes a clamping system that uses the 1st derivative of the parabola curve at three specific points to force flexible material to take the shape of a perfect parabola. The flexible material is calculated to have exactly the right length to fit the coordinate system. In the past, the shape of a parabola has only been approximate, or needs a support system that follows the exact shape of the parabola. This invention provides a method for constructing a parabolic reflector that has the exact shape of a parabola, but does not needed to be supported along its entire length to maintain this shape and is intended to make the construction of a perfect parabolic reflector less expensive. Described is a basic method of constructing a perfect parabolic reflector. This method is then used to construct a six reflector system to concentrate sunlight as well as other forms of similar parallel incoming radiation from a large rectangular area to a small rectangular area. This produces a highly concentrated beam of parallel radiation. A new kind of telescope is described that also uses the six reflector system.

DESCRIPTION OF A PREFERRED EMBODIMENT

One basic method for Creating a Perfect Parabolic Trough Reflector can be defined in several steps as set forth below.

(1) First the height and width of the parabola to be built is determined.

Figure 1:
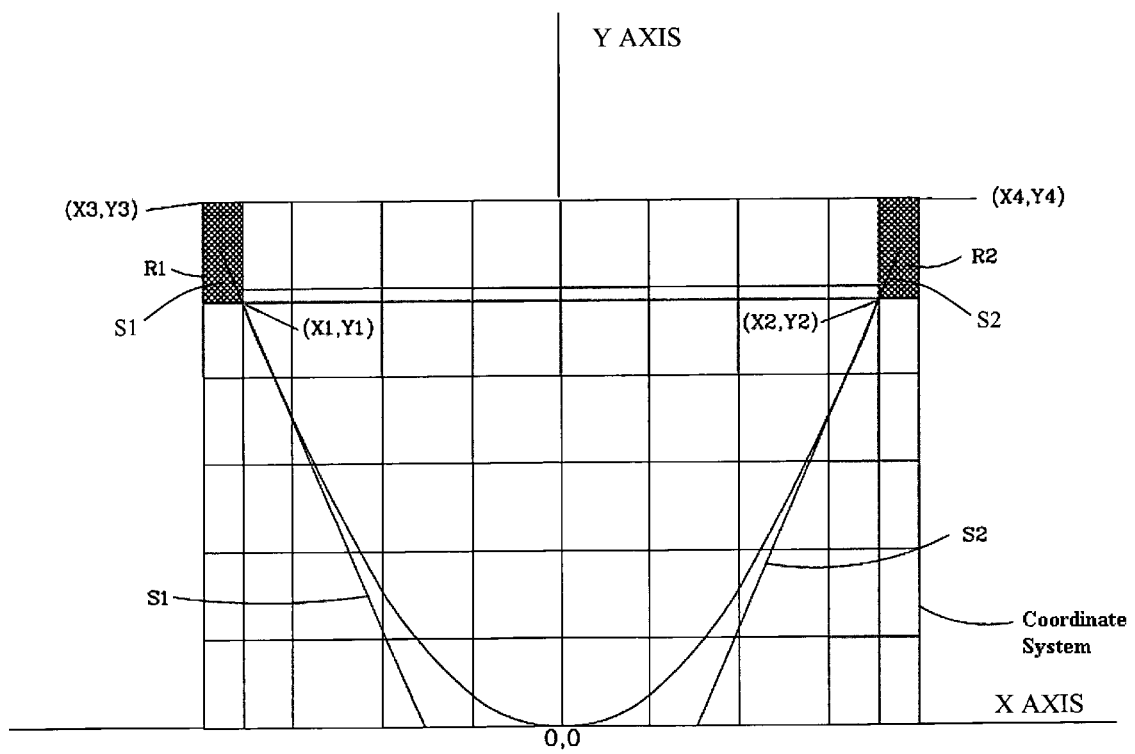
FIG. 1 shows the coordinate system and the calculated points to form the parabola.

(2) A coordinate system (see FIG. 1) is defined, such that the origin (0,0) is at the bottom dead center of the coordinate system. The coordinates (−width,height) and (width, height) are defined near the two upper corners of the coordinate system. As shown in FIG. 1, and hereinafter (X1, Y1)=(−width,height) and (X2,Y2)=(width,height). The height of the actual parabola will be Y1 or height and the actual width of the parabola will be X2−X1 or 2·width.

(3) The parabolic equation is defined to be $f(x)=a \cdot x^2$ where $a=\text{height}/\text{width}^2$. The plot of this equation will produce a parabola that fits into the coordinate system and touches the coordinate system at the points (0,0), (X1,Y1), (X2,Y2) and at no other point.

(4) The points (X3, Y3) and (X4,Y4) are defined to be at the opposite corners of the two smaller rectangles R1,R2 from the respective points (X1,Y1) and (X2,Y2) as shown in FIG. 1. The two small rectangles R1,R2 are the anchor points of the parabola at its end points (X1,Y1) and (X2, Y2). The third anchor point (0,0) is at the origin. The dimensions of the coordinate system shown in FIG. 1 are therefore (X4−X3) and (Y4).

(5) The lines (indicated as S1,S2) at the upper anchor points are a plot of the lines that have a slope of the 1st derivatives of the parabola at the points (X1,Y1) and (X2,Y2) and intercept these points. The $1^{st}$ derivative of the parabola $f(x)=a \cdot x^2$ is $f'(x)=2 \cdot a \cdot x$.

(6) The slots (also identified as S1, S2, and defined as the lines in (5) above) in the support blocks R1, R2 are used to anchor the parabola. Slots S1,S2 must have the slope of the lines in step (5), touch the points (X1,Y1) and (X2,Y2) respectively, and extend into the blocks for a sufficient distance to allow the material used to form the parabola to be anchored. The width of the slots should match the width of the reflective material. In addition, the point (0,0) must be anchored to the bottom dead center of the coordinate system and the 1st derivative of the curve at this point must be 0. The ends of the parabola in slots S1 and S2, and the bottom center (0,0) may be anchored, for example, by screws or clamps.

(7) The length of the curve of the parabola is calculated as follows:

$$f(x)=a \cdot x^2$$

$$dy/dx=2 \cdot a \cdot x$$

To calculate the length of the parabolic curve you start with the equation for the length of an infinitesimal part of the curve (dl) and integrate over the length of the curve.

$$dl^2=dx^2+dy^2$$

$$dy=2 \cdot a \cdot x \cdot dx$$

$$dy^2=4 \cdot a^2 \cdot x^2 \cdot dx^2$$

$$dl^2=dx^2+4 \cdot a^2 \cdot x^2 \cdot dx^2$$

$$dl^2=(1+4 \cdot a^2 \cdot x^2) \cdot dx^2$$

$$dl=\sqrt{1+4 \cdot a^2 \cdot x^2} \cdot dx$$

$$l(x)=\int \sqrt{1+4 \cdot a^2 \cdot x^2}\, dx$$

or $$l(x)=\text{length}(x)=a \cdot [x \cdot (\sqrt{x^2+b^2})+b^2 \cdot \ln(x+\sqrt{x^2 b^2})]$$

In the formula, "a" is the coefficient of the parabola defined in step (3), and "b"=1/(2·a). The length of the parabolic curve from the point (X1, Y1) to the point (X2,Y2) is length (X2)−length(X1). To this is added the length of material that extends into both slots S1,S2. Both anchor blocks R1,R2 are mirror images of each other so the slots at both points are of the same length. This means only one kind of anchor block has to be built. However, mathematically this does not have to be so, as long as the calculations are done correctly to compensate for slots of different lengths.

(8) Once the calculations have been performed, a suitable ridged support structure is constructed (see FIG. 2, discussed below) to hold the points (0,0),(X1,Y1),(X2,Y2) of the parabola, and their 1st derivatives in their proper places. To insure a slope of 0 at the origin of the coordinate system, the center of the length of the reflective material from points (X1,Y1) to (X2,Y2) is anchored at the origin by, for example, a screw, a rivet, or by some other means. The symmetry of the bending forces of the material will cause the 1st derivative of the origin to be 0 as required. Each side of the rectangular piece of reflective material must be supported in this way. The two sides of the support structure are joined by suitable means to form a parabolic trough. The material used for the reflector should be of the same thickness throughout, and must be homogeneous. In addition, the strength of the material must be strong enough to hold the shape of the parabolic reflector. Weaker material may be used, but additional support points along the curve may be required. However, it should not be necessary to support the material along the entire length of the curve unless it is chosen to do so.

Figure 2:
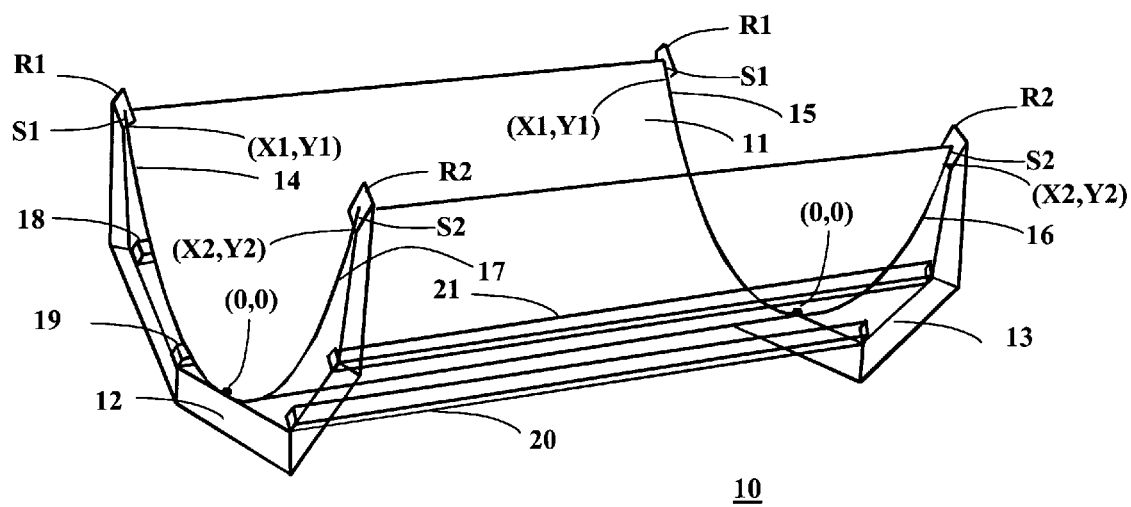
FIG. 2 shows a parabola of the present invention.

FIG. 2 shows an embodiment 10 of a Perfect Parabolic Trough Reflector. The parabola 11 has its edges 14,15,16,17 in slots S1 and S2 in supports 12 and 13. Edges 14 and 15 are in slot S1 as shown in FIG. 1, and Edges 16 and 17 are in slot S2 also shown in FIG. 1. The two small rectangles R1 and R2 found in FIG. 1 are also indicated. The portions of the parabola 11 extending into supports 12 and 13 are the 1st derivatives extending from the parabola 11 into the support blocks R1 and R2 as discussed above in the preferred embodiment. The supports 12 and 13 are attached to additional supports 18, 19, 20, and 21. The supports 12,13,18,19,20 and 21 along with edges 14,15,16, and 17 form the support structure, as discussed above, that provides the means for forming and supporting the parabola.

The (0,0) point of the parabola in FIG. 2, corresponds to the point (0,0) in FIG. 1. The points, (X1,Y1) and (X2,Y2) of the parabola are shown in FIG. 2 and also correspond to the points (X1,Y1) and (X2,Y2) in FIG. 1.

The support structure in FIG. 2 is shown as an example. Other support structures may be used.

FIG. 2 is representative of what the reflector will really look like, but it is only an approximation. It is the placement and structure of the mounting points that is important and not the shape of the support structure itself which can vary greatly according to design.

Figure 3:
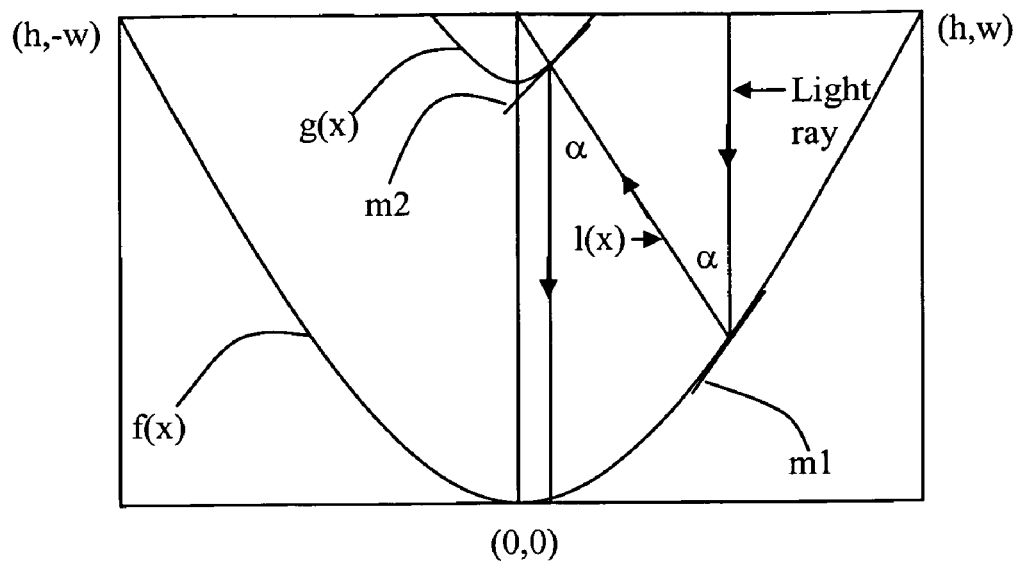
FIG. 3 shows a two reflector system.

(9) To construct a six reflector system it is first necessary to describe how to build a two reflector system. If one reflector described above is a scaled down copy of the other one, and if both reflectors are arranged to have their focal points coincide, then a trough reflector can be built that can be used to concentrate parallel radiation such as sunlight. This arrangement is depicted in FIG. 3. FIG. 3 shows an incoming light ray striking the larger parabola and being reflected in the direction of the focus. The angle of reflection is labeled α. As the ray travels toward the focus, it strikes the second parabola and is reflected in a direction that is parallel to the incoming light ray. A slot can be cut in the larger reflector to allow the light ray to exit through the bottom of the reflector system. The result is a concentrated rectangular beam of light that is much narrower than the rectangular beam of light that strikes the larger reflector.

Mathematically, this can be shown to be true for all angles α that intercept both parabolas from (h,−w) to (h,w).

First establish the equation for the larger parabola:

$$a = \frac{h}{w^2}$$

$$f(x) = a \cdot x^2$$

$$\text{focus} = \frac{1}{4 \cdot a}$$

$$\text{focus} = \frac{w^2}{4 \cdot h}$$

Next define the equation for the smaller parabola by using a scale factor b where $$0 < b < 1$$

$$c = \frac{b \cdot h}{(b \cdot w)^2}$$

$$c = \frac{h}{b \cdot w^2}$$

$$c = \frac{a}{b}$$

$$g(x) = c \cdot x^2$$

$$sfocus = \frac{1}{4 \cdot c}$$

$$sfocus = \frac{b}{4 \cdot a}$$

$$sfocus = b \cdot \text{focus}$$

Set the focus of both parabolas to be the same and define the equation for the second smaller parabola.

$$g(x) = c \cdot x^2 + \text{focus} - sfocus$$

$$g(x) = c \cdot x^2 + (1 - b) \cdot \text{focus}$$

$$g(x) = \frac{a}{b} \cdot x^2 + (1 - b) \cdot \text{focus}$$

$$g(x) = \frac{a}{b} \cdot x^2 + (1 - b) \cdot \frac{1}{4 \cdot a}$$

$$g(x) = \frac{f(x)}{b} + (1 - b) \cdot \frac{1}{4 \cdot a}$$

The general equation for a line is y=m·x+b. Establish the slope "m" of the line that passes through the common focus. m=tan (α+90)

Now write the equation for the line that passes through the focus.

$$l(x) = m \cdot x + \text{focus}$$

$$l(x) = m \cdot x + \frac{1}{4 \cdot a}$$

Find the intercept point for the larger parabola.

$$a \cdot x^2 = m \cdot x + \frac{1}{4 \cdot a}$$

Find the positive root for this equation.

$$\frac{1}{(2 \cdot a)} \cdot \left(m + \sqrt{m^2 + 1}\right)$$

Find the slope of the line of f(x) using its first derivative.

$$2 \cdot a \cdot x$$

$$2 \cdot a \cdot \left[\frac{1}{(2 \cdot a)} \cdot \left(m + \sqrt{m^2 + 1}\right)\right]$$

$$m + \sqrt{m^2 + 1}$$

Find the intercept point for the smaller parabola.

$$\frac{a}{b} \cdot x^2 + (1 - b) \cdot \frac{1}{4 \cdot a} = m \cdot x + \frac{1}{4 \cdot a}$$

Find the positive root for this equation.

$$\frac{1}{(2 \cdot a)} \cdot b \cdot \left(m + \sqrt{m^2 + 1}\right)$$

Now find the slope of the line for g(x) using its first derivative.

$$2 \cdot \frac{a}{b} \cdot x$$

$$2 \cdot \frac{a}{b} \cdot \left[ \frac{1}{(2 \cdot a)} \cdot b \cdot \left(m + \sqrt{m^2 + 1}\right) \right]$$

$$m + \sqrt{m^2 + 1}$$

Figure 4:
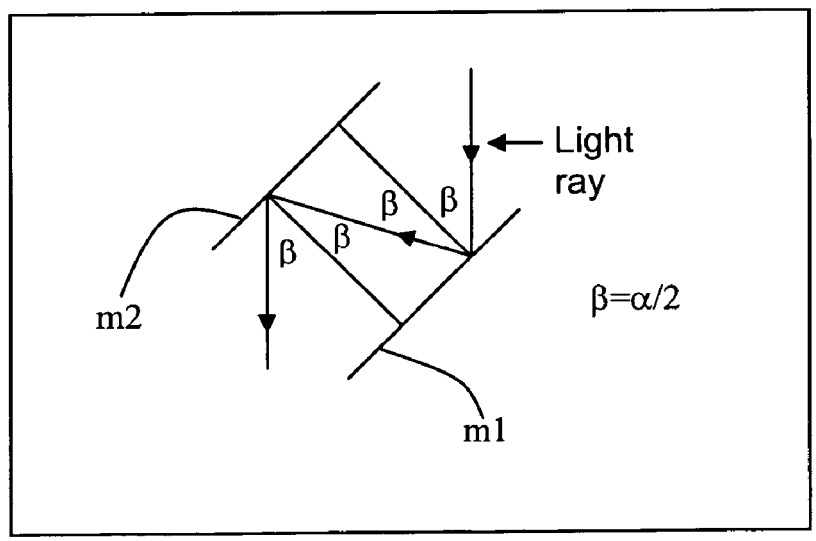
FIG. 4 further illustrates how the two reflector system works.

FIG. 3. shows that the slopes of the lines that pass through the first derivatives of the intercept points of the two parabolas with the line 1(x) are equal. If two small mirrors depicted as m1 and m2 are placed at the intercept points of the two parabolas with 1(x) with the same slope as the first derivatives of the two parabolas at those points, then they will reflect the incoming ray of light the same way as the parabolas f(x) and g(x) will. Any incoming light ray that is perpendicular to the x axis of FIG. 3 will strike the mirror representing the larger parabola and reflect off of that mirror at the same angle of incidence that it strikes the mirror according to Snell's law of optics. The same thing will happen when this reflected ray heading toward the focus hits the mirror (m2) representing the smaller parabola g(x). What happens to a ray of light that passes through the two reflectors is depicted in FIG. 4. The two lines that are perpendicular to the two parallel mirrors are also parallel, so the alternate interior angles of these lines are equal. The result is the incoming light ray and the exiting light rays are parallel.

Figure 5:
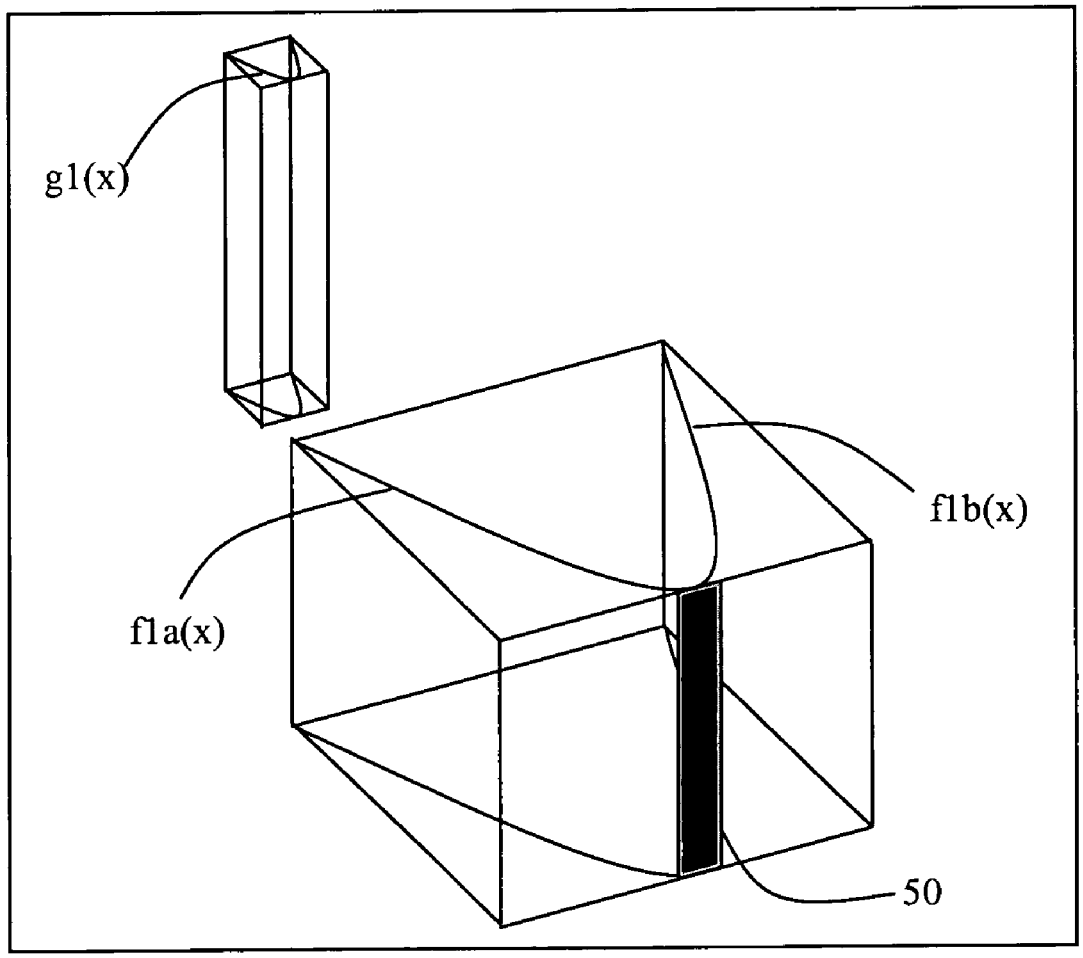
FIG. 5 shows a three dimensional view of a horizontal reflector system.
Figure 6:
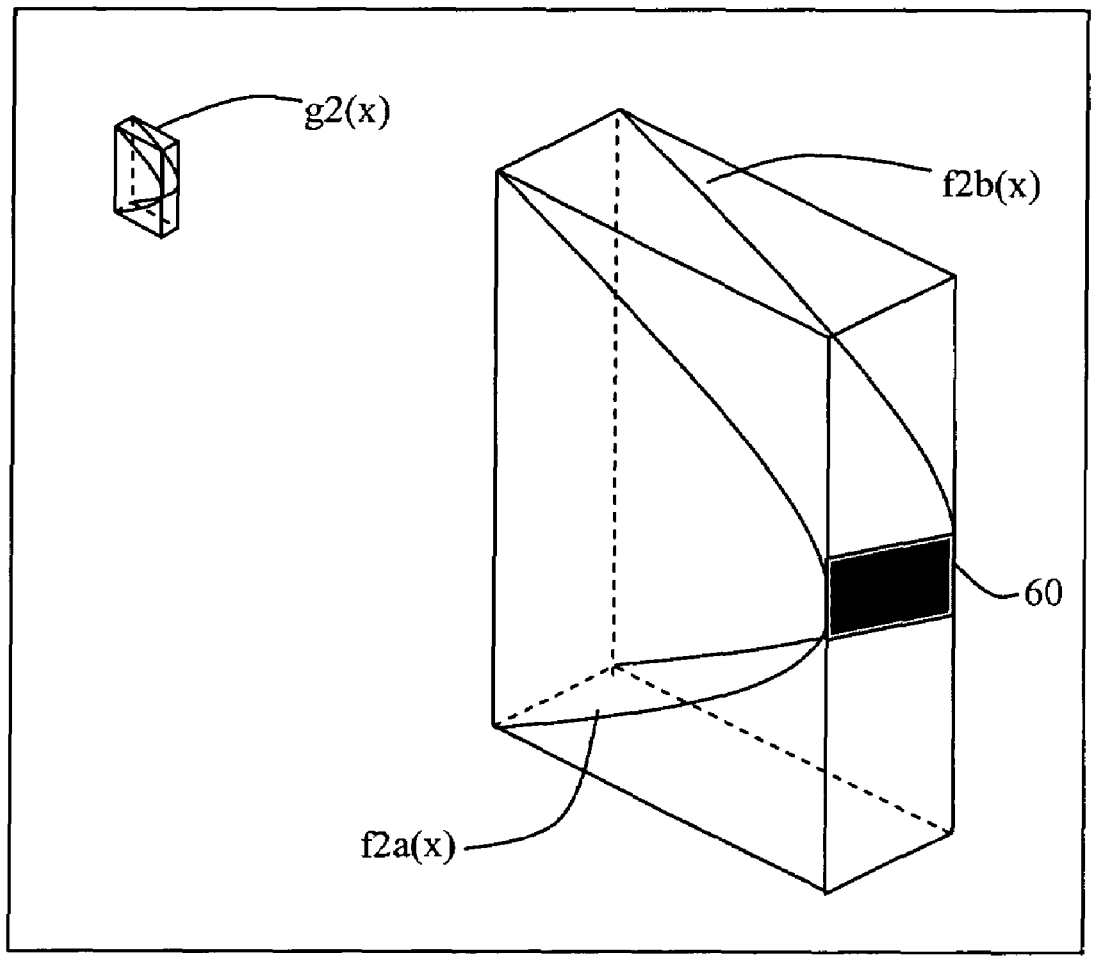
FIG. 6 shows a three dimensional view of a vertical reflector system.
Figure 7:
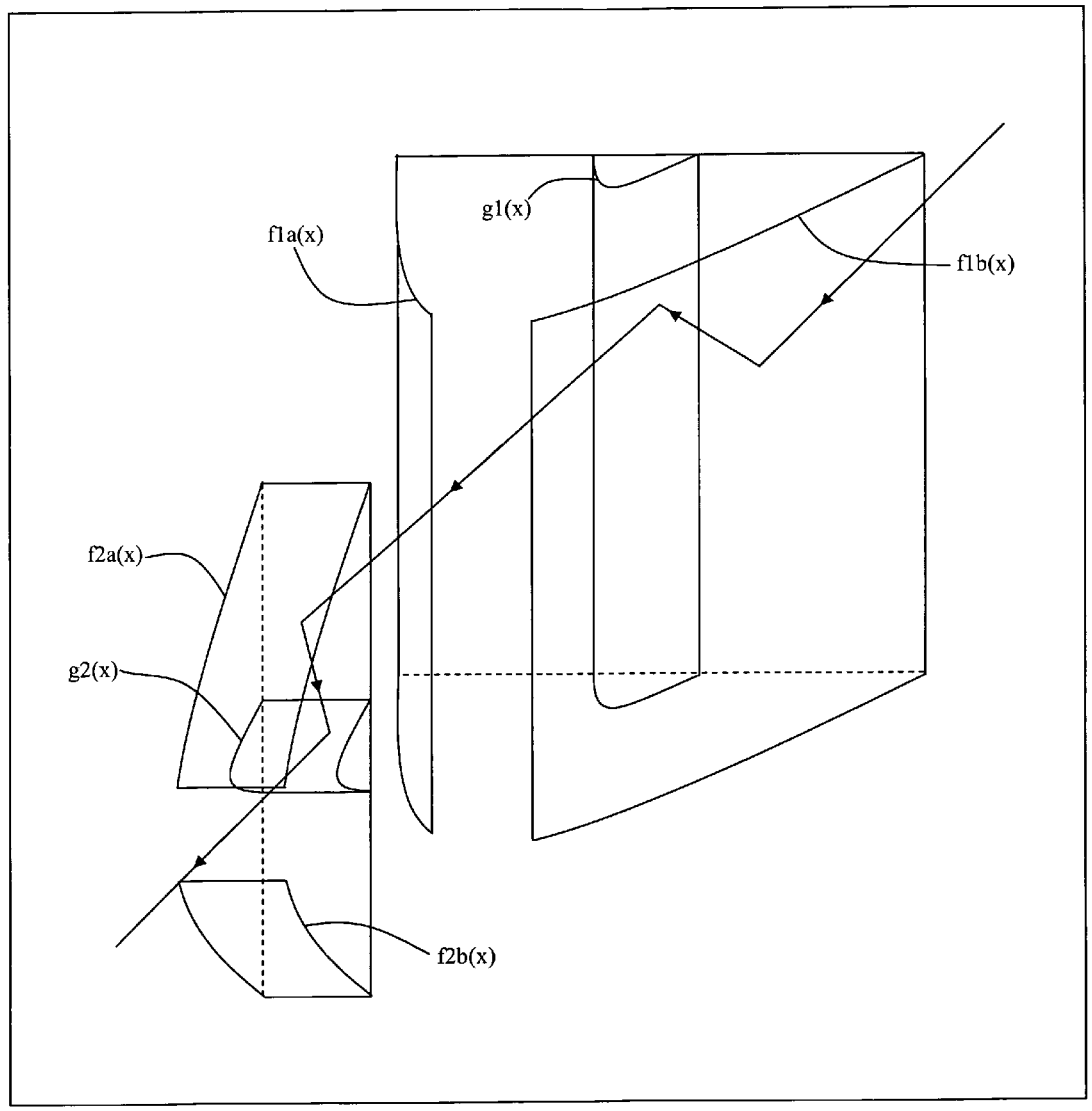
FIG. 7 shows a three dimensional view of the combined reflector systems of FIG. 5 and FIG. 6.
Figure 8:
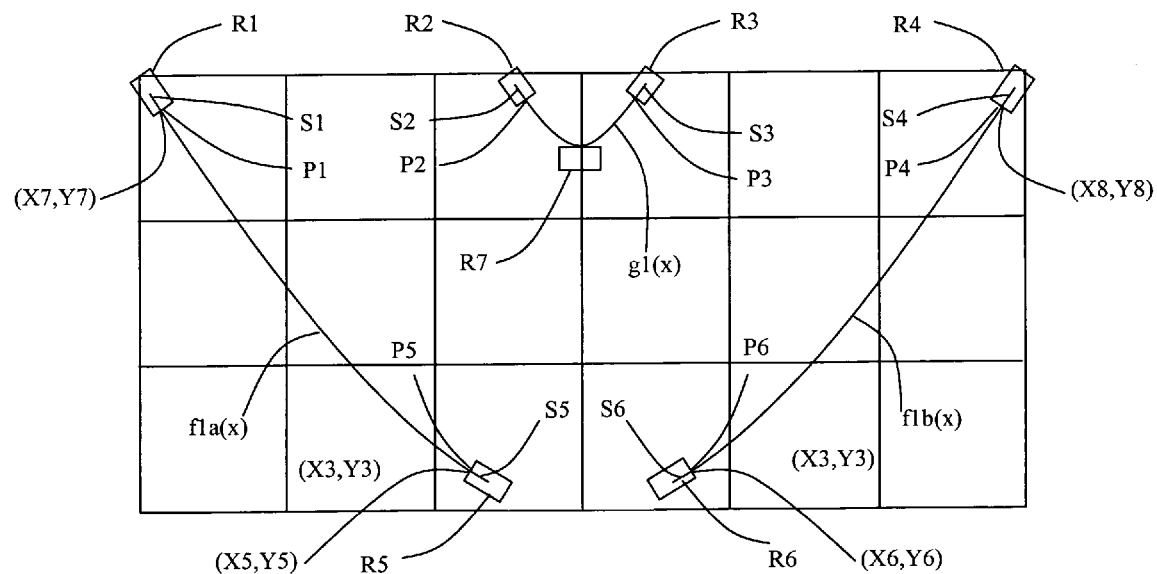
FIG. 8 depicts how the mounting system works for the three reflector system.
Figure 9:
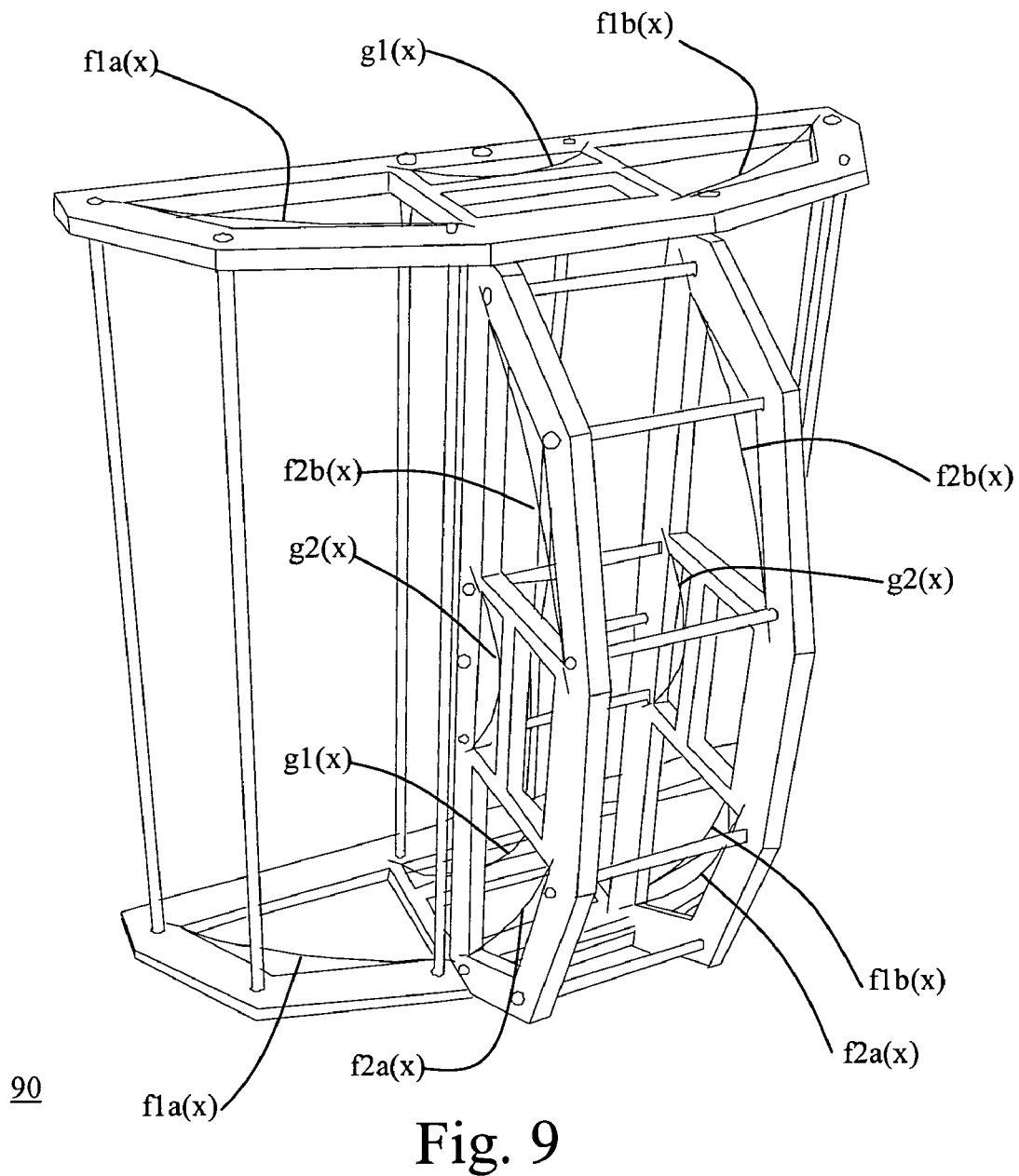
FIG. 9 shows a view from the behind and left of a six reflector system.
Figure 10:
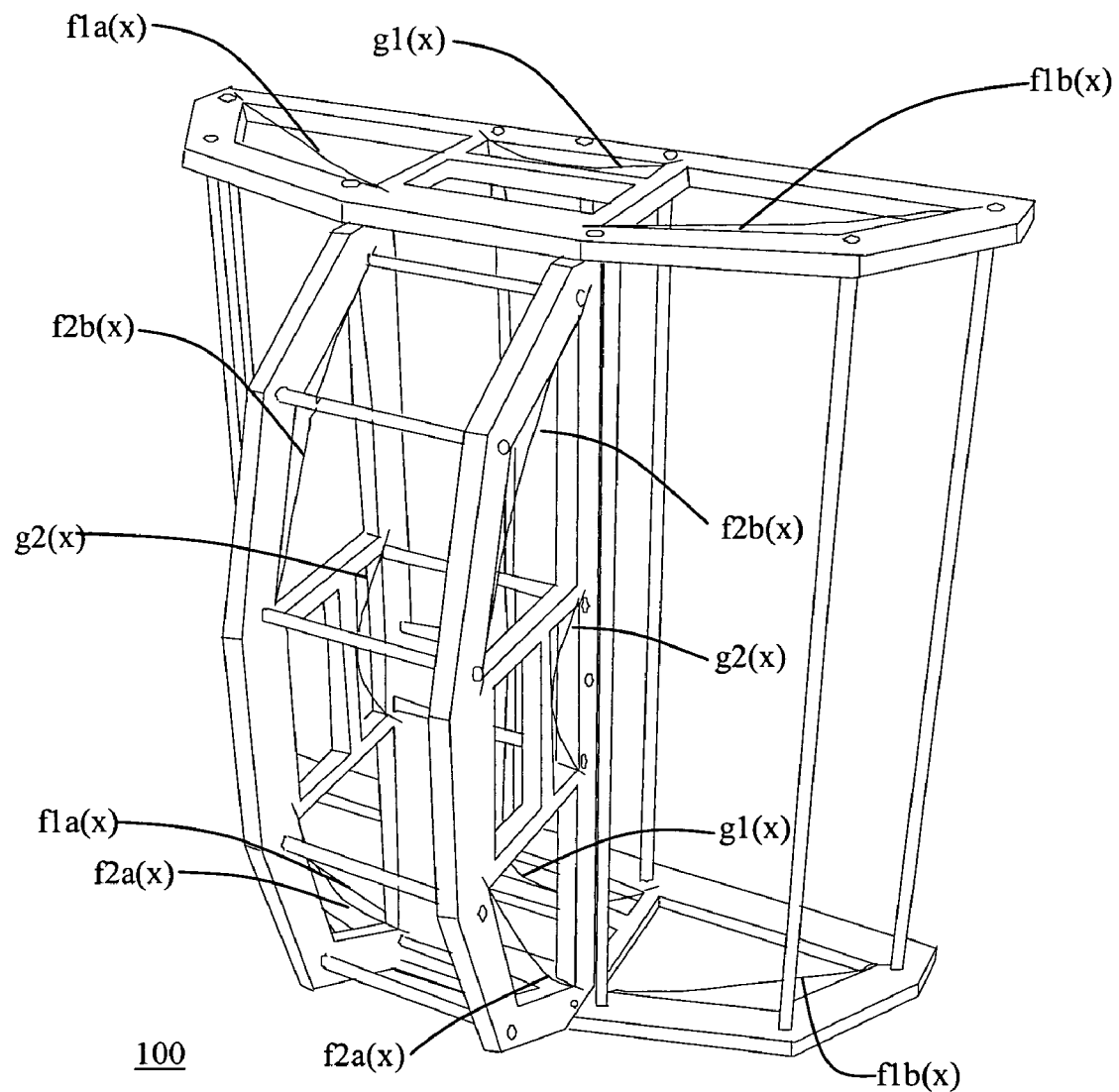
FIG. 10 shows a view from the behind and right of a six reflector system.

Horizontal parabolas arranged as described above will concentrate a broad parallel beam of sunlight to a narrow beam of the same height as the reflector. This configuration is shown in FIG. 5. The grey area in FIG. 5 represents the concentrated sunlight that is coming out of the back of the horizontal reflectors. The grey area represents an opening in the rear reflector. FIG. 8 shows this view from the top. The reflector has been split into two reflectors each with a set of anchor blocks. As before, the length segments for these parabolic segments can be calculated using the length(x) formula. The length of the parabolic segment f1a(x) will equal the length of parabolic segment length f1b(x) since these segments are mirror images of each other. The length of segment f1b(x)=length(X8)–length(X6). As before the lengths of the material extending into the slots are added to the result of this calculation. The anchor blocks R1 through R7 are calculated to have the right slopes and the correct positions to support the three reflectors. S1 through S7 designate the slots as defined in (5) above. P1 through P6 designate the (X,Y) coordinates where the $1^{st}$ derivatives of the parabolic curves are calculated also as defined in (5) above. Note that the small one piece reflector g1(x) needs a third anchor point where its $1^{st}$ derivative is zero just as in the single reflector system. This sunlight can be further concentrated in the vertical direction by using another set of parabolic reflectors that are perpendicular to the axis of the first set of reflectors. The second set of reflectors is shown in FIG. 6. The second set of three vertical reflectors will be constructed using the same procedure as the first set of three horizontal reflectors except the width of the vertical reflectors will match the width of the back opening of the horizontal reflectors. Again the grey area represents the beam of sunlight coming out of the back of the larger reflector. The two three reflector systems can be combined to form a larger six reflector system by placing the vertical reflectors behind the opening in the horizontal reflector. This is shown in FIG. 7. The aperture of the vertical reflectors should match the dimensions of the rear aperture of the horizontal reflectors, and the apertures should be aligned. One example of the support structure of this is shown in FIG. 9 and FIG. 10. Using six reflectors to focus light essentially has the same effect as a magnifying glass covering the area of the largest reflector. Instead of focusing light to a small circle or point, the six parabolic reflectors focus a large rectangular area of sunlight or parallel radiation to a very small rectangular parallel beam of sunlight or other parallel radiation. The horizontal reflectors can be interchanged with the vertical reflectors with the appropriate change in dimensions. This beam can be used to drive a sterling generator just like the big dish parabolic reflectors are doing presently, or it can be used to concentrate light on solar cells. A suitable drive system will have to be designed to support and rotate the six reflector system to track the source of radiation. The tracking system will be designed around a cylindrical coordinate system. It can be used to concentrate microwave radiation in satellite dishes as well as other applications where concentration of electromagnetic radiation is desired. It can also be used for concentrating sound waves. A large reflector of this design can concentrate sunlight by a factor of thousands of times creating a very powerful source of energy. Unlike the dish method, there are no molded spherical surfaces and it is much cheaper to build using the forced parabola method to build parabolas.

Figure 11:
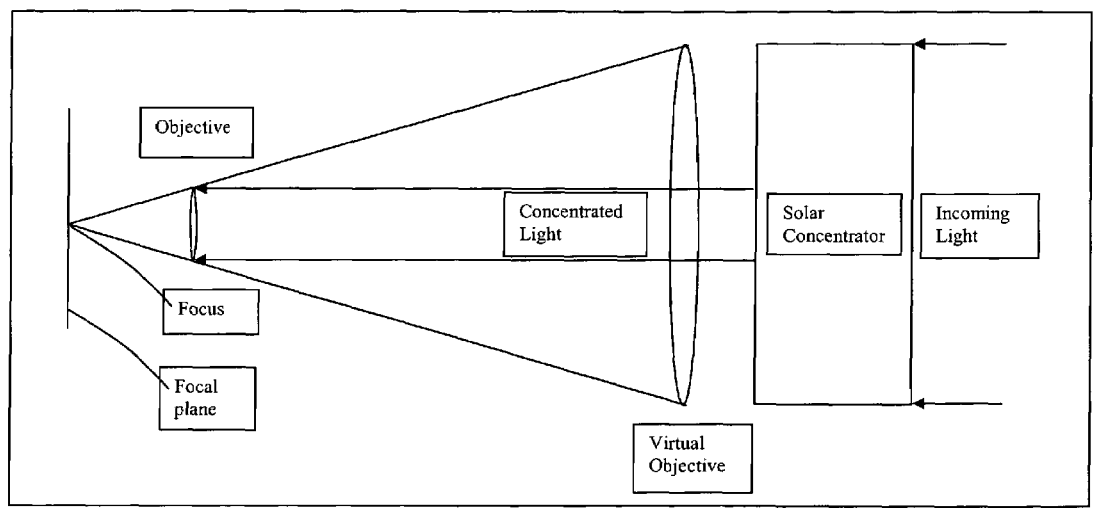
FIG. 11 shows how a new kind of telescope functions.

If a small refracting telescope is placed at the back exit of the six parabola concentrator, it is possible to build a telescope that has a much higher power and light gathering capability of the smaller telescope. The objective of the refracting telescope will take the parallel light that is coming out of the back of the solar concentrator and focus it to a point. The solar concentrator will focus an image on the focal plain of the objective of the smaller telescope. The parallel light coming out of the back of solar concentrator will be a scaled down image of the parallel light coming into the front of the concentrator. If parallel light comes in at an angle from a distant object like a planet that is off axis of the solar concentrator and the telescope, it focuses to a point on the focal plane of the objective of the smaller telescope with little or no distortion. The smaller telescope will function like a much bigger telescope. The objective of the small telescope will look like a much larger lens that matches the diameter of the larger solar concentrator. This means that the lens will have an effective focal length that is the focal length of the objective of the smaller telescope multiplied by the ratio of the diameter of the aperture of the solar concentrator divided by the diameter of the objective of the smaller telescope. If the small refracting telescope has an objective of 3" and a focal length of 3 feet, and the solar collector as a square aperture of 30", then the objective of the small telescope will look like a lens with a diameter of 30", and a effective focal length of 30 feet. Since the power of a refracting telescope is the ratio of the focal length of the objective to the focal length of the eyepiece, the power of the combination of the small refracting telescope and the solar collector would be 10 times the power of the small refracting telescope alone. A 200 power refracting telescope combined with the solar concentrator described above would have an effective aperture of 30 inches and a power of 2,000! FIG. 11 is a basic diagram of the telescope.

What is claimed is:
1. A first parabolic trough reflector, comprising:
   a coordinate system defining a length of a curve of a parabola;
   a first parabolic trough reflector mounted in a rigid support structure as defined by the coordinate system, each end of the first parabolic trough reflector having an extended length secured in a mounting block with defined slots;
   the first parabolic trough reflector comprising a flexible reflective material mounted in the rigid support structure, each end of the flexible reflective material having an extended length secured in the mounting block attached to the rigid support structure with the defined slots such that the flexible reflective material forms the first parabolic trough reflector when supported only by the mounting blocks;

the first parabolic trough reflector has a length and a width as well as a focal point and a reflective surface directing incoming radiation toward the focal point, the first parabolic trough reflector being split about a midpoint of the width;

a second parabolic trough reflector positioned between the first parabolic trough reflector and the focal point of the first parabolic trough reflector, the second parabolic trough reflector having a length approximately the same as the first parabolic trough reflector and a width about the same as the split of the first parabolic trough reflector, the second parabolic trough reflector having a same focal point as the first parabolic trough reflector and a reflective surface facing away from the focal point to direct radiation reflected from the first parabolic trough reflector through the split in the first parabolic trough reflector.

2. The first parabolic trough reflector of claim 1 wherein the second parabolic trough reflector is comprised of:
   a second rigid support structure defining the length and width of the second parabolic trough reflector;
   a second flexible reflective material mounted in the second rigid support structure, each end of the second flexible reflective material having an extended length secured in a second set of mounting blocks attached to the second rigid support structure with defined slots such that the material forms the second parabolic trough reflector when supported only by the second set of mounting blocks, 3. The first parabolic trough reflector of claim 2 wherein:
   the second set of mounting blocks secure the second flexible reflective material in slots, the slots having a slope that matches a derivative of the desired parabola at an entrance to each slot.

4. The first parabolic trough reflector of claim 1 further comprising:
   a third parabolic trough reflector having a length perpendicular to the length of the first parabolic trough reflector and at least as long as the width of the second parabolic trough reflector, a width about the same as the length of the first parabolic trough reflector, a second focal point, a reflective surface facing the second focal point directing radiation that travels through the split in the first parabolic trough reflector toward the second focal point and a split about the bottom of the third parabolic trough reflector;

a fourth parabolic trough reflector having a length about the same as the length of the third parabolic trough reflector and a width about the same as the split in the third parabolic trough reflector, a focal point the same as the second focal point of the third parabolic trough reflector and a reflective surface facing away from the second focal point directing radiation reflected from the third parabolic trough reflector through the split in the third parabolic trough reflector.

5. The first parabolic trough reflector of claim 4 wherein the third parabolic trough reflector is comprised of:
   a third rigid support structure defining the length and width of the third parabolic trough reflector; and
   a third flexible reflective material mounted in the third rigid support structure, each end of the third flexible reflective material having an extended length secured in a third set of mounting blocks attached to the third rigid support structure with defined slots such that the material forms the third parabolic trough reflector when supported only by the third set of mounting blocks.

6. The first parabolic trough reflector of claim 5 wherein:
   the third set of mounting blocks secure the third flexible reflective material in slots, the slots having a slope that matches a derivative of the desired parabola at an entrance to each slot.

7. The first parabolic trough reflector of claim 5 further comprising an optical lens telescope positioned behind the third parabolic trough reflector such that radiation reflected through the split in the third parabolic trough reflector enters the objective end of the optical lens telescope.

8. The first parabolic trough reflector of claim 4 wherein the fourth parabolic trough reflector is comprised of:
   a fourth rigid support structure defining the length and width of the fourth parabolic trough reflector; and
   a fourth flexible reflective material mounted in the fourth rigid support structure, each end of the fourth flexible reflective material having an extended length secured in a fourth set of mounting blocks attached to the fourth rigid support structure with defined slots such that the material forms the fourth parabolic trough reflector when supported only by the fourth set of mounting blocks.

9. The first parabolic trough reflector of claim 8 wherein:
   the fourth set of mounting blocks secure the fourth flexible reflective material in slots, the slots having a slope that matches a derivative of the desired parabola at an entrance to each slot.

* * * * *